A. A. SCOTT.
VEHICLE.
APPLICATION FILED NOV. 13, 1916.
1,320,282.
Patented Oct. 28, 1919.
5 SHEETS—SHEET 1.
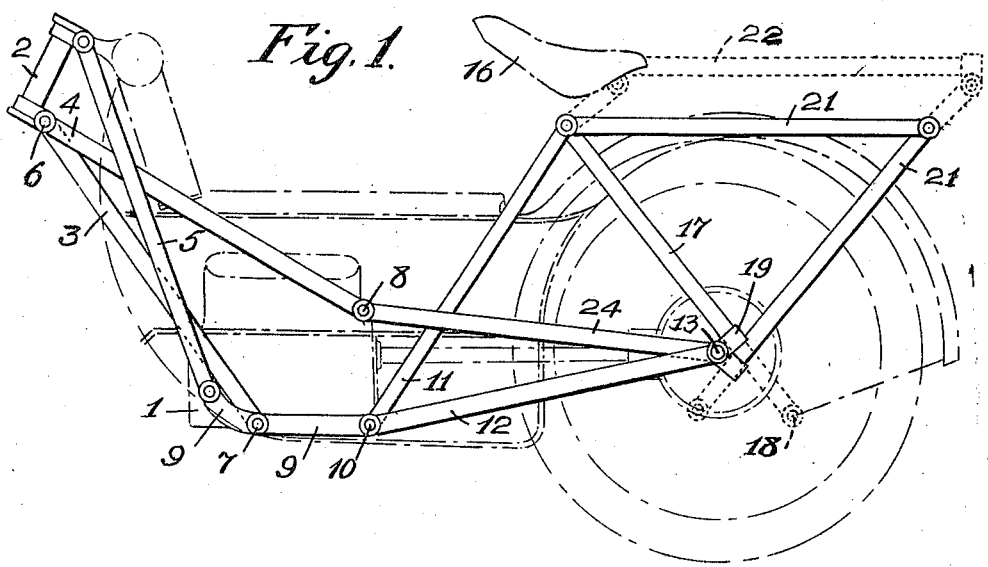
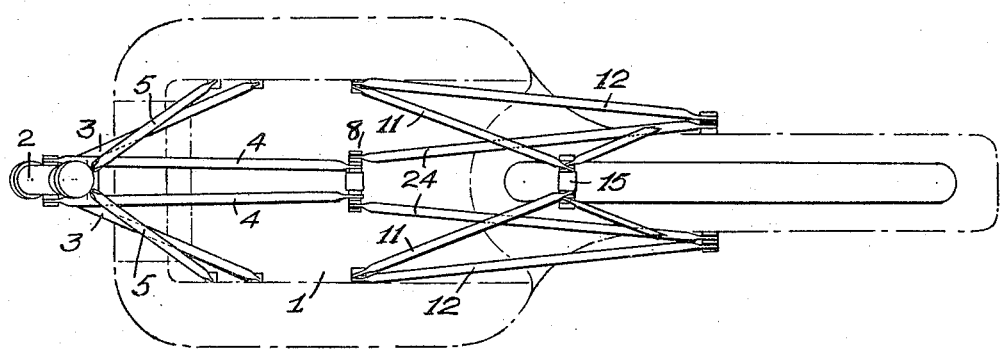

A. A. SCOTT.
VEHICLE.
APPLICATION FILED NOV. 13, 1916.

1,320,282.

Patented Oct. 28, 1919.
5 SHEETS—SHEET 2.

Witnesses
B. B. Thompson
A. J. Finotti

Inventor
Alfred A. Scott
by Sturtevant & Mason
attorneys.

A. A. SCOTT.
VEHICLE.
APPLICATION FILED NOV. 13, 1916.

1,320,282.

Patented Oct. 28, 1919.
5 SHEETS—SHEET 3.

Inventor:
Alfred A. Scott
By Sturtevant Mason
Attorneys

A. A. SCOTT.
VEHICLE.
APPLICATION FILED NOV. 13, 1916.

1,320,282.

Patented Oct. 28, 1919.
5 SHEETS—SHEET 5.

Inventor;
Alfred A. Scott
By Sturtevant & Mason
Attorneys

UNITED STATES PATENT OFFICE.

ALFRED A. SCOTT, OF BRADFORD, ENGLAND.

VEHICLE.

1,320,282.      Specification of Letters Patent.      Patented Oct. 28, 1919.

Application filed November 13, 1916. Serial No. 131,080.

*To all whom it may concern:*

Be it known that I, ALFRED ANGAS SCOTT, subject of the King of Great Britain, residing at Bradford, in the county of York, in the Kingdom of England, have invented certain new and useful Improvements in and Relating to Vehicles, of which the following is a specification.

The present invention relates to improvements in vehicles, more particularly self-propelled vehicles such as motorcycles and automobiles, but in certain forms is also applicable to cycles propelled by the rider.

The object of the present invention is to eliminate the bending and twisting strains to which the structures of such vehicles have been previously subject, and further in certain cases to build up the frame so that in case of accident any member can be easily replaced.

By the present invention the wheels and load are interconnected by a plurality of interchangeable strut elements, that is to say detachable struts of similar shape and end connections. These struts are preferably connected together and to nuclei, such for instance as wheel axles, engine or saddle support, in triangular skeleton structures preventing bending and twisting strains on the struts which may be further eliminated by forming each strut with a ball joint connection, or the latter feature may be used without the struts necessarily being interchangeable.

The invention is more particularly described with reference to the accompanying drawings, in which:—

Figure 1 is an elevation of the major portion of a motor bicycle frame according to the present invention.

Fig. 2 is a corresponding plan view.

Figure 5:
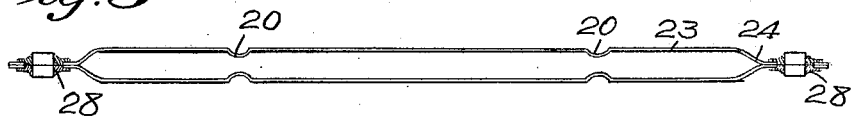
Fig. 5 is a detail of a strut.
Figure 4:
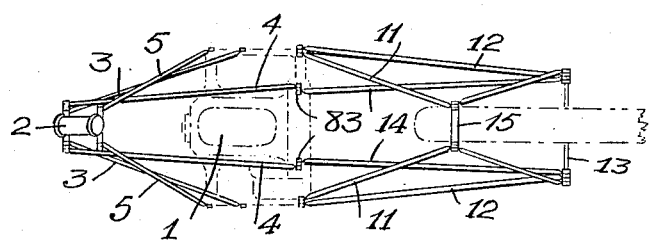
Fig. 4 is a plan view of a modification.

A frame for instance for a motorcycle, has an engine 1 and steering head 2 connected together by pairs of struts 3, 4, 5. These struts are each of similar length that is to say, the strut 3 between its points of connection 6, 7, is of the same length and therefore interchangeable with the strut 4 between its points of connection 6, 8, and this again is interchangeable with the strut 5. The engine 1 forms a nucelus to which the series of skeleton triangulated structures formed of the strut elements are secured. Where part of this is of soft metal the engine 1 may be carried in a partial cradle being shown at 9, to carry the axles forming points of connection such as 7. The cradle 9 will form a carrier for a bolt 10 which forms the apex of the skeleton triangulated structures consisting of pairs of struts 11, 12 interchangeable with one another similarly to the members 3, 4, 5. The struts 12 are connected at their outer ends to the rear wheel axle 13 which again is connected to the point of connection 8 by a pair of struts 24, again arranged in the form of a skeleton triangulated structure. The pair of struts 11 are connected at their apex by a bolt carrying a sleeve 15 adapted to support the saddle or seat 16. This bolt also forms a point of connection for a pair of struts 17 which may be connected at the opposite ends directly to the axle 13, or to be interchangeable with the other strut elements, are preferably extended beyond this to a point such as 18 which point of connection may serve to carry a stand for the vehicle or may form a point of connection for a mudguard stay or the like. In this case the strut 17 is connected to the axle 13 by a clamp 19 engaging it intermediate its length. The inter-connection between the clamp 19 and the strut 17 may be any suitable type, for instance, the strut 17 may have an annular depression in it such as that indicated at 20 (Fig. 5).

Further, pairs of members 21 can be provided to form a carrier. These members 21 are not essential to the structure of the motor bicycle and may be completely omitted but where provided can be used for various purposes. It will be seen that as they are not essential to the structure, should for instance one of the essential elements such as 3, 4, 5, 11, 12, 24 or 17, be damaged in any way, then the extra advantage of the elements 21 may be sacrificed for the time being and one of these elements could immediately replace one of the essential damaged elements of the structure.

If desired, the saddle 16 may be carried by parallel link constructions connected to the struts 21 by springs so as to form a floating saddle and carrier 22, as illustrated in dotted lines in Fig. 1. In this case the elements 22 may again be interchangeable with any of the other similar strut elements.

By disposing the elements or struts 3, 4, 5, 11, 12, 24, 17, in the form of skeleton triangulated structures and supporting the load at the apices of bases only it will be possible to arrange that the struts are only subject to direct compression or tension and are not subject to any bending or torsion. For this purpose each strut element is preferably formed as shown in Fig. 5 with a ball joint either whole or partial at its end. The strut element remains interchangeable and in view of its characteristic that only direct tension or compression is placed upon it, it can be considerably lighter than otherwise would be necessary.

Figure 6:
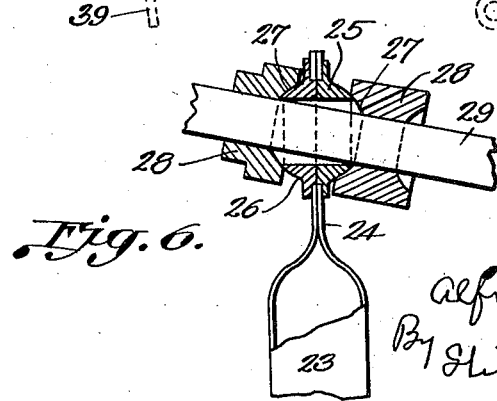
Fig. 6 is a further detail of an interconnecting joint for the struts.

One suitable form of joint is illustrated in Fig. 6 in which the end of the tubular strut element such as 23 is flattened as shown at 24 and perforated. A pair of annular flanged washers 25 are then arranged about the perforation and may be secured if desired on to the end 24. The washers 25 have partial spherical surfaces 26 thereon adapted to engage with corresponding surfaces 27 on washers 28 acting as intermediate elements between the strut 23 and a strut to which it is to be connected, or any other element to which it may be connected. The spherical surfaces are held in engagement and strut elements are connected together by a bolt 29 threaded through the perforation in the strut and intermediate elements and it will be seen that the bolt 29 is of less diameter than the diameter of the perforation through the washers 25 so that a considerable play within certain limits is allowed of the joint. Consequently, it will be seen that the joint adapts itself immediately to the pressure upon it so that a direct axle tension or compression only can be transmitted to the element or strut 23.

A fork for a cycle, motorcycle or the like vehicle may comprise such strut elements 30 connected to a bar 31 carried by a top head 32 which may be interchangeable with the bottom head 33, these parts being carried by the steering head 34 which may be of usual construction. The steering head 34 carries upper and lower ball races 35, 36 of usual construction. These however may be as shown similar and interchangeable. They form points of connection for the elements 3, 4 and 5 as already described. The bottom head 33 forms the base for two pairs of struts 37, 38, which can extend downward to a point 39, in which case they may be clamped intermediate their ends in the manner above indicated by a clamp 40 carrying the wheel axle 41, or in the case in which the wheel is spring supported a stub axle. The axle 41 is further connected by a pair of strut elements 30 to the top head 32. In the case in which the wheel is spring supported, springs 43 may be arranged between the point 39 and the link 44. The link 44 is carried on a pivot 45 on the end of the strut elements 46 connected together at their outer ends. The elements 46 are interchangeable with, for instance, the elements 30 or any other strut in the structure forming the vehicle. Parts of the connections 45 would, however, be preferably rigid.

Figure 9:
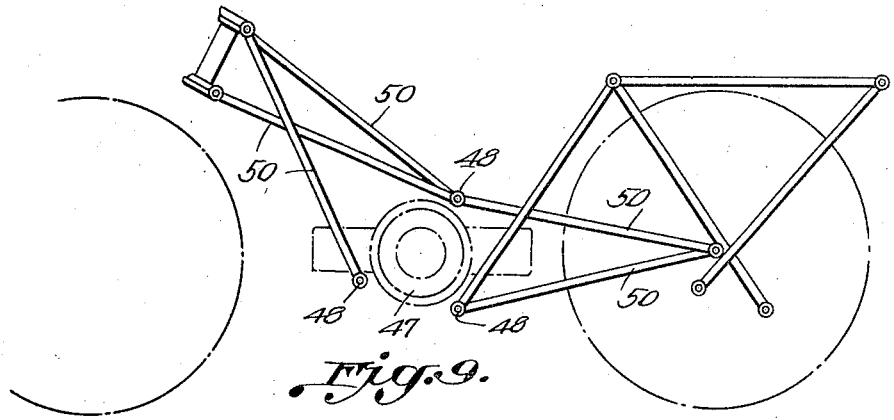
Figs. 9, 10 and 11 show diagrammatically various modifications according to the present invention as applied to motor cycles.
Figure 10:
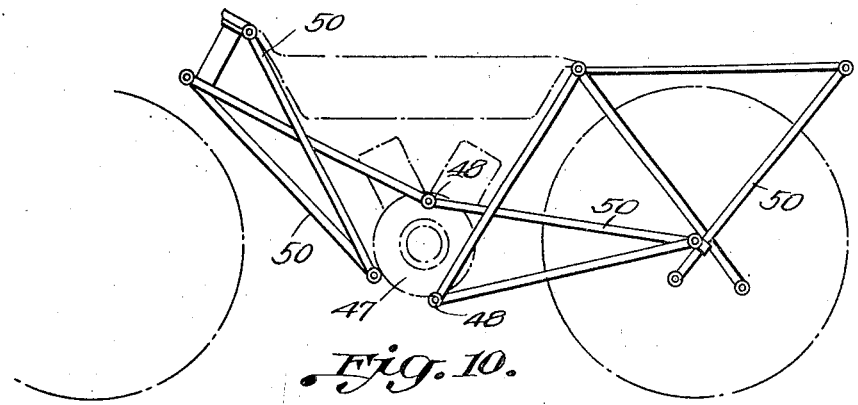
Figure 11:
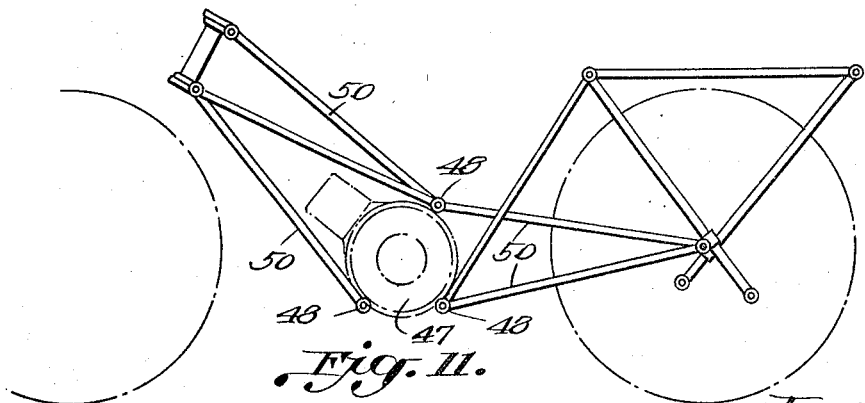

Figs. 9, 10 and 11 show designs of frame construction in which the engine 47 forms a nucleus and has three parallel axes 48 on it forming bases for the triangular structures formed with interchangeable elements 50 similar in length and preferably of the construction outlined above, in which each of these has a ball jointed end.

Figure 7:
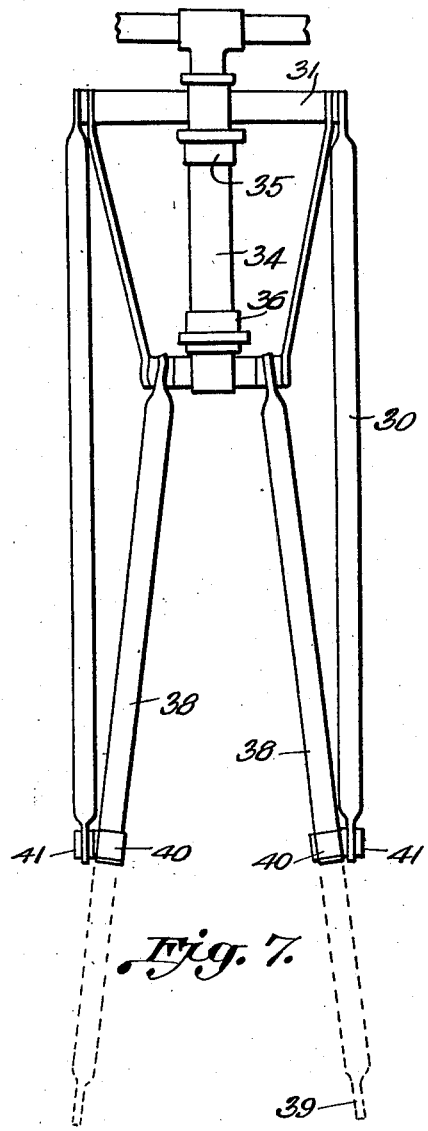
Fig. 7 is a front elevation of a steering fork.
Figure 8:
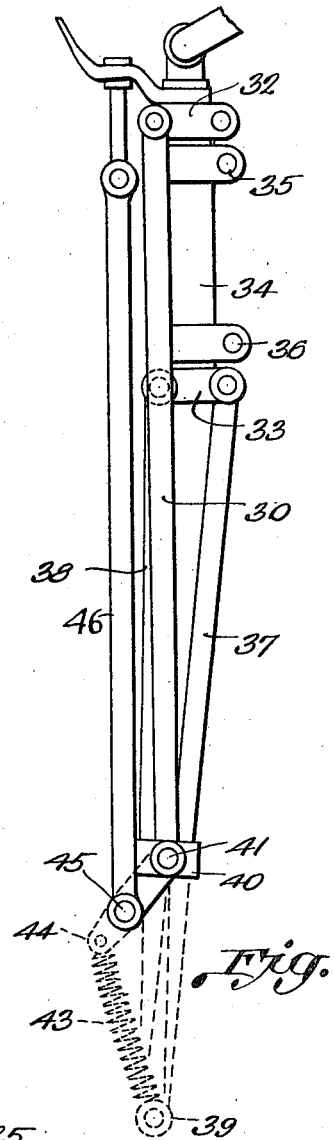
Fig. 8 is a corresponding side view.
Figure 12:
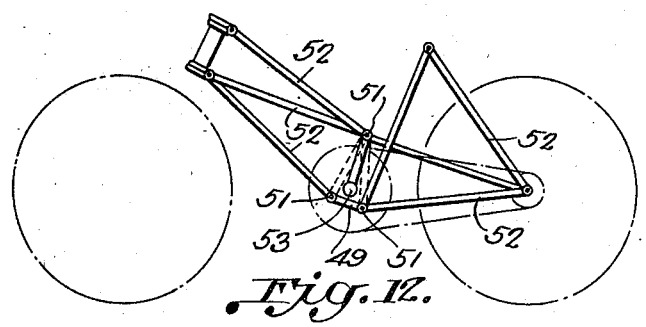
Fig. 12 shows the arrangement of the present invention applied to an ordinary cycle.

Such an arrangement of interchangeable detachable and preferably ball jointed struts may be disposed to form a rider-propelled bicycle as shown in Fig. 12, in which case the nucleus is formed of a frame consisting of a cradle 49 connecting the three points 51 forming connections for the interchangeable struts 52 and serving to carry the crank axle 53 for the pedaling gear. The fork of such a cycle would be of course similar to that illustrated in Figs. 7 and 8 formed of elements interchangeable with the struts 52.

Figure 13:
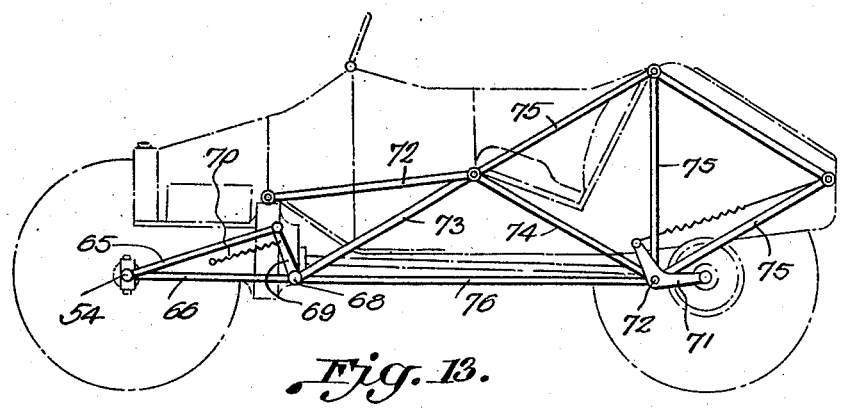
Figs. 13 and 14 are front elevation and plan views respectively showing the arrangement of the present invention applied to a four-wheeled self-propelled vehicle.
Figure 14:
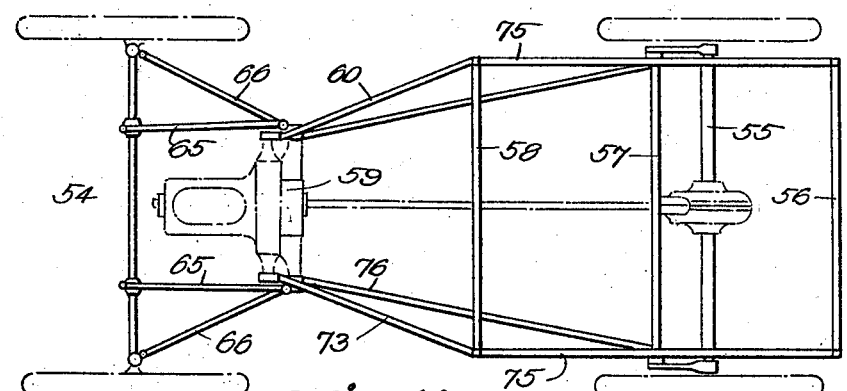

The improvements of the present invention may further be applied to a four-wheeled vehicle in which one form is shown in Figs. 13 and 14. In this case parallel elements such as the two axles 54, 55, and base elements 56, 57, and 58, act as nuclei together with the engine or engine and transmission unit 59 for the interchangeable and preferably ball-jointed strut elements 60 which form the inter-connecting means between these parts and the supports for the load. The front axle 54 may be carried by two pairs of interchangeable strut elements 65, 66, connected to bases formed of links 69, the whole being pivoted about an axis 68 carried rigidly by the engine element 59, a spring or springs 70 allowing for floating support of the front axle. The back axle may be similarly carried or may be carried by bell crank structures 71 as shown, the pivot 72 being the strut 57 forming an apex of triangulated structure carrying the body of the vehicle. It may not be always convenient to have one standard length of interchangeable or similar struts and consequently two or more sets may be provided. For instance, the elements 65, 66, are similar in length and form one series while the elements 72, 73, 74, 75, may form another series of interchangeable members, while again the members 76, 58, 57, may form a third series of interchangeable elements.

Figure 3:
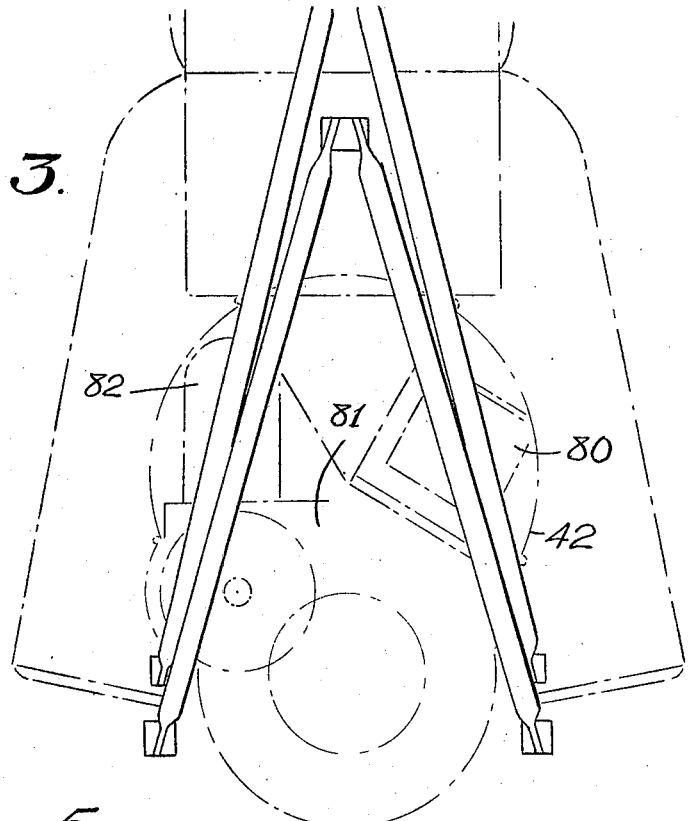
Fig. 3 is a corresponding front elevation.

The frame construction of motorcycle according to the present invention lends itself particularly to for instance a shaft drive transmission as illustrated in Figs. 1 and 3. An engine, which may be of any desired type, can be carried for instance with the axis of the cylinders 80 inclined to the vertical, the other side of the engine being occupied by a platform 81 which may carry the magneto 82, electric lighting outfit or any other desired parts. The whole therefore is symmetrical and can be inclosed by a detachable bonnet 42. The magneto petrol tank (not indicated) and other parts are all carried directly by the engine which is supported on the cradle 9 and by the point of suspension or axis 8. As illustrated in Fig. 2 this axis 8 may consist of a short bolt, but where the engine is vertical the base points of the two strut elements 4 may be arranged farther apart and secured to independent points 83 on the engine.

It will be seen therefore by the present invention that a frame can be expeditiously assembled. Also again it will be seen that out of a single set of elements a number of which would be duplicated, such as for instance a series of struts, the engine and wheels, either a motorcycle or a four-wheeled automobile can be assembled in a very short space of time.

A vehicle by the present invention has interchangeable struts that is the invention allows of one standard replacement strut to act for any strut whatever in the structure which may happen to become damaged. In the more complicated structures of automobile vehicles, two or three sets of standard elements may of course be used instead of one.

I declare that what I claim is:—

1. A vehicle comprising in combination wheels, a nucleus, a load-supporting seat or the like on a plurality of load-supporting spherical-ended struts, in triangular disposition one to the other connecting said wheels, nucleus, and load-support.

2. A vehicle comprising in combination wheels, a nucleus, a load-supporting seat or the like, on a plurality of load-supporting spherical-ended and detachable struts in triangular disposition one to the other, connecting said wheels, nucleus, and load-support.

3. A vehicle comprising in combination wheels, a nucleus, a load-supporting seat or the like on a plurality of load-supporting spherical-ended interchangeable and detachable struts, in triangular disposition one to the other, connecting said wheels, nucleus and load-support.

4. A vehicle comprising in combination wheels, a nucleus, a load-supporting seat or the like on a plurality of load-supporting spherical-ended struts in triangular disposition to one another, connecting said wheels, nucleus and load-support, and a prime mover connected to said wheels to propel the same.

5. A vehicle comprising in combination wheels, a nucleus, a load-supporting seat or the like on two separate sets, each consisting of a plurality of load-supporting spherical-ended interchangeable and detachable struts, in triangular disposition one to the other, connecting said wheels, nucleus and load-support.

6. A vehicle comprising in combination wheels, a nucleus, a load-supporting seat or the like on a plurality of load-supporting spherical-ended struts in triangular disposition one to the other connecting said wheels, nucleus, and load-support, and means to limit the movement of said struts about their spherical ends.

7. A vehicle comprising in combination wheels, a nucleus, a load-supporting seat or the like on a plurality of load-supporting annular spherical-surfaced rings on the perforate ends of said struts, and connecting bolts between said struts and said nucleus, wheels and load-support.

8. A vehicle comprising in combination wheels, a plurality of nuclei presenting parallel axes for attachment, a load supporting seat or the like on a plurality of load-supporting spherical-ended struts, in triangular disposition one to the other connecting said wheels, nucleus, and load-support.

9. As an article of manufacture, a steering fork for vehicles comprising a nucleus, a plurality of interchangeable detachable struts arranged in triangular relationship, a wheel, and spring interconnection between said struts and said wheel.

10. As an article of manufacture, a steering fork for vehicles comprising a nucleus, a plurality of interchangeable detachable spherical-ended struts arranged in triangular relationship, a wheel, and spring interconnection between said struts and said wheel.

In witness whereof I have hereunto signed my name this 1st day of November, 1916, in the presence of two subscribing witnesses.

ALFRED A. SCOTT.

Witnesses:
 FRED HAMMOND,
 R. B. NICHOLLS.